United States Patent Office 3,082,246
Patented Mar. 19, 1963

---

3,082,246
PREPARATION OF TERTIARY ESTERS
Harry Chafetz, Poughkeepsie, N.Y., assignor to Texaco Inc., New York, N.Y., a corporation of Delaware
No Drawing. Filed Feb. 17, 1960, Ser. No. 9,162
7 Claims. (Cl. 260—497)

The instant invention relates to a catalytic process for the preparation of carboxylic acid esters of tertiary alcohol and, more particularly, to such a process where a "tertiary base" or, more simply, a "tertiary olefinic compound" is reacted in an esterification zone with a carboxylic acid employing sulfur dioxide as the catalyst.

Using, for example, acetic acid and the hydrocarbon isobutylene, the reaction can be represented as follows:

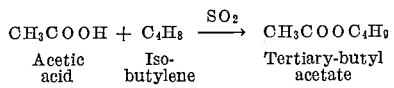

| Acetic acid | Iso-butylene | Tertiary-butyl acetate |

Such ester is useful as a paint solvent and as a grease component. In addition, it is a valuable additive for improving the octane rating of high quality leaded gasoline. As a group these esters are solvents for many organic materials and, therefore, are useful as vehicles therefor.

The condensing of a tertiary olefinic compound with a carboxylic acid is usually done in the presence of a catalyst. Some of the catalysts employed in the past were sulfuric acid, complexes of boron trifluoride, orthophosphoric acid suitably supported on an inert support such as kieselguhr, benzenesulfonic acid, alkyl sulfates, or other strong mineral or organic acids. Such catalysts are normally present as a distinct liquid phase in the esterification reaction mixture, or are homogeneous therewith, or are sorbed on a solid porous carrier such as silica, charcoal or alumina.

In the condensation of a tertiary olefin compound with a carboxylic acid to form a tertiary ester there is a serious competing reaction, namely, that of polymer formation from the tertiary olefinic material. The esterification reaction involving tertiary olefins is far more sensitive to polymer competition than is the corresponding reaction involving a secondary olefin or a primary olefin. Actually, when secondary olefins such as butene-2 are condensed with carboxylic acids, it is conventional to rid the hydrocarbon feed of "tertiary olefins" by causing them to polymerize, then to operate with the remaining secondary olefin containing feed. By means of our process hydrocarbon streams can be freed of tertiary olefins without significant polymerization to make a valuable ester product efficiently and the so-treated unreacted hydrocarbons separated from the ester for other use.

An advantage of our process over conventional processing of tertiary olefinic compounds for the tertiary ester formation is the effect of suppressing the polymerization of these olefins while esterifying at temperatures up to about 350° F. A further advantage of our process over conventional treatment is it permits the separation of the ester product from the reaction mixture by heat treatment methods such as distillation without undesirable decomposition of the ester product. Distillation or other heat treatments of the crude ester product in the presence of strong acids such as sulfuric acid, phosphoric acid, sulfonic acid, hydrochloric acid and the like even in the presence of an extremely small amount of said acids usually results in the rapid breakdown of the ester product.

In accordance with the foregoing, I have discovered that sulfur dioxide is extremely effective in catalyzing the reaction between a tertiary olefinic compound and a carboxylic acid to form the corresponding tertiary ester. In addition, I have discovered that the sulfur dioxide catalyst effectively suppresses the undesirable polymerization of the olefin, does not favor the formation of secondary and primary esters and can be readily separated from the ester product without decomposition of said product.

In a typical operation of my novel process the tertiary olefin is contacted with a carboxylic acid in a mol ratio of between about 1:10 and 10:1, preferably between about 1:4 and 4:1, at a temperature between about 135 and 350° F., preferably between about 150 and 225° F. and under a pressure between about 50 and 2000 p.s.i.g., preferably between about 100 and 300 p.s.i.g. in the presence of between about 0.5 and 20 mol percent sulfur dioxide, preferably between about 1 and 10 mol percent, based on the total mols of said olefin and acid.

The novel process is operative whether the reactants and catalyst be in the liquid phase or in a liquid-vapor phase equilibrium. In any case, it is desirable that they be thoroughly mixed prior to or during the reaction period in order to insure high yields of ester product.

The process can be either continuous or batch. If a continous operation is employed, it is desirable to admix the reactants and catalysts with one another prior to their exposure to the reaction zone. In such a system the admixture can be fed into the reaction zone at temperatures less than are found in the major portion of said zone and then allowed to reach the reaction temperature autogenously by exothermic heat of reaction. Alternatively, indirect reactor cooling or heating can be used. In a continuous process the reaction mixture is continuously withdrawn from the reaction zone. The components comprising the withdrawn stream can be separated from one another by any standard means such as fractionation. For economc purposes it is desirable to recycle the sulfur dioxide and unreacted reactants to the reaction zone.

My novel process may also be a batch or a combination of a batch or continuous process. In the latter, the reactants, catalyst and formed products are passed through the reaction zone and continuously recycled therethrough with batch or incremental withdrawal of the reaction mixture for the separation of the ester product therefrom and the subsequent return of the catalyst and unreacted reactants to the circulating reaction system.

Corrosion resistant reaction vessels are in order, e.g. ones of austenitic stainless steel, high chrome stainless steel and the like because of the possible corrosive tendencies of the carboxylic acid reaction in the process.

By the term "tertiary olefinic hydrocarbon," I intend a hydrocarbon containing at least one tertiary olefinic carbon. The useful olefinic starting materials for my process have at least one side chain branching from an olefinic carbon atom (including an olefinic carbon atom in a cyclic structure). Specific examples of suitable olefinic hydrocarbons for use in my process include isobutylene, 2-methyl-1-butene, 2-methyl-2-butene, 3-ethyl-3-heptene, 2,3-dimethyl-3-decene and 1-methyl-1-cyclohexene. As a practical limitation because of the cost and availability the aliphatic $C_{4-12}$ tertiary monoolefinic hydrocarbons are the most desirable for my process.

The olefins can be pure, mixed with each other or mixed with unreactive or substantially less reactive materials. Thus, for example, we can use pure isobutylene made by cracking an isobutylene dimer. On the other hand, we can use a $C_4$ and/or a $C_5$ cut from a catalytic or a thermal cracking operation, which would ordinarily contain somewhat less than 20% of the tertiary olefin and the balance of other diluent hydrocarbons. A typical so-called "B-B" stream from catalytic cracking can contain 10–25 mol percent isobutylene, 50 mol percent paraffins and the balance preponderantly butene-1, and cis- and trans-butene-2. A suitable stream for making tertiary-butyl carboxylic acid esters is a stream containing about 25 mol percent butylenes and the balance predominantly normal butane.

Other olefins which may be employed in my process are the polyolefins such as 2,4-dimethyl-2,4-hexadiene and isoprene. Also suitable are oxygenated aliphatic hydrocarbon compounds of tertiary base olefinic carbon configuration, e.g., alkyl vinyl ethers such as ethyl or methyl vinyl ether. Conceivably, the tertiary base olefin compound can be one wherein one or more hydrogen atoms are substituted with an inert substituent such as halogen (e.g. chlorine), an alkoxy radical, a nitro group, a tertiary phosphate or phosphate radical or an aromatic such as a phenyl group.

The particular carboxylic acid used is dictated by the particular product desired. Because the presence of water in the esterification reactor induces a competing reaction, namely, one wherein tertiary alcohols are made, the reactions should be virtually anhydrous for best results to make the ester exclusive. Thus, for example, when acetates are made exclusively, glacial acetic acid (99.5% pure) should be used.

The carboxylic acid reactants can be fatty acids suitably in the range from formic to stearic acids and advantageously $C_1$–$C_8$ faty acids. Alternatively, they can be polybasic, e.g. saturated aliphatic hydrocarbon dibasic acids such as malonic, oxalic and so on suitably up to sebacic or even higher. They can have inert nuclear substituents for hydrogen atoms (such as keto, nitro, halogen, alkoxy tertiary phosphate, etc.). They can have an aromatic nucleus such as benzoic, phthalic, toluic or the like.

Typical of the carboxylic acids which can be employed in the condensation with olefins contemplated herein include the following: acetic, malonic, propionic, butyric, isobutyric, valeric, isovaleric, acetone dicarboxylic, 2-ethyl hexanoic, benzoic, caproic, octanoic, formic, oxalic, monochloroacetic and cyclohexane carboxylic.

The reaction can be conducted in the presence of an inert vehicle, e.g. ether, benzene, toluene or the like. Such a technique can be useful for dissolving one or both reactants.

The subsequent example shows ways in which my invention has been practiced but should not be construed as limiting the invention.

EXAMPLE I

In all runs reported in subsequent Tables A and B the following procedure was employed:

The isobutylene or $C_4$ fraction containing isobutylene, acetic acid and sulfur dioxide were introduced into a one gallon enclosed stainless steel batch reactor fitted with an agitator, thermometer, pressure gauge, heat exchange coils and valved entrances and exits. The mixture was stirred from ½ to 4 hours and at the close of that period, the reaction mass was cooled to room temperature. The pressure in the batch reactor was reacted to atmospheric and the liquid remaining therein was withdrawn. The withdrawn liquid was analyzed by mass spectrometry.

In runs Nos. 550 and 562 found in Table B the tertiary butyl acetate was recovered from the withdrawn reaction mixture utilizing the following procedures:

*Run No. 550.*—One part of the liquid reaction mixture removed from the batch reactor was mixed with 2.5 parts of water and 2.1 parts of ether. The resulting organic layer was separated from the aqueous layer and washed with 2 parts of 10% aqueous sodium hydroxide, dried over anhydrous potassium carbonate and distilled. The fraction recovered at a distillation temperature of between 201 and 207° F. at 1 atm. was identified as tertiary butyl acetate.

*Run No. 562.*—One part of the final reaction mixture was removed from the batch reactor and mixed with 2.1 parts of triisobutylene, 1 part of crushed ice and 1.8 parts of potassium carbonate. The resultant mixture foamed and after the foaming had ceased the organic layer was separated from the aqueous layer, washed with 1 part of water, dried over anhydrous calcium sulfate and distilled. The fraction recovered at a distillation temperature between 201 and 207° F. at 1 atm. was identified as tertiary butyl acetate.

In Table A below are found the reaction data for the conversion of isobutylene in admixture with one or more $C_4$ hydrocarbons.

Table A

| | Run No. | | |
|---|---|---|---|
| | 572 | 573 | 585 |
| Reaction Ingredients: | | | |
| Hydrocarbon Reactant, Mol— | | | |
| Isobutylene | 4 | 4 | 2.4 |
| butene-1 | 0 | 4 | 1.6 |
| butene-2 | 4 | 0 | 3.2 |
| isobutane | 0 | 0 | 8.5 |
| Acetic Acid, Mol | 16 | 16 | 16.7 |
| Mol Ratio of i-$C_4H_8$/acetic acid | 1/4 | 1/4 | 1/7 |
| Sulfur dioxide, Mol | 0.2 | 0.2 | 1.7 |
| Mol percent of $SO_2$ based on total acid and hydrocarbon reactant | 0.8 | 0.8 | 5 |
| Wt. percent of $SO_2$ based on total acid and hydrocarbon reactant | 1.0 | 1.0 | 5.7 |
| Reaction Conditions: | | | |
| Temp., °F. | 250 | 250 | 200 |
| Time, Hrs. | 4 | 4 | 4 |
| Pressure, p.s.i.g. | 200 | 230 | 210 |
| Products, mol percent yield [1]: | | | |
| t-butyl acetate | 27 | 28 | 32 |
| sec-butyl acetate | 0 | 0.6 | 0 |
| diisobutylene [2] | 0.5 | 1 | 0 |
| Products, wt. percent yield [1]: | | | |
| t-butyl acetate | 56 | 58 | 66 |
| sec-butyl acetate | 0 | 1 | 0 |
| diisobutylene | 1 | 2 | 0 |

[1] Based on isobutylene charge.
[2] Mols diisobutylene formed/Mols isobutylene charged.

As can be seen from the above, little or no polymerization takes place with sulfur dioxide as the catalyst. In addition, there is shown that $SO_2$ selectively forms tertiary-butyl esters to the substantial exclusion of secondary-butyl esters.

In Table B below, are found data concerning the conversion of isobutylene to tertiary-butyl acetate, the isobutylene being the only hydrocarbon present.

Table B

| Run No. | Mol Ratio, $C_4H_8$/acetic acid | $SO_2$, Mol Percent of Total Reactants | $SO_2$, Wt. Percent of Total Reactants | Temp., °F. | Pres., p.s.i.g. | React. Time, hrs. | Yield | | |
|---|---|---|---|---|---|---|---|---|---|
| | | | | | | | t-butyl acetate, mol percent [1] | t-butyl acetate, wt. percent [1] | Diisobutylene, wt percent [1] |
| 571 | 1/2 | 5 | 5.4 | 175 | 115 | 4 | 31 | 64 | 0.3 |
| 567B | 1/2 | 5 | 5.4 | 200 | 140 | 3 | 47 | 97 | 0.8 |
| 583 | 1/1.07 | 3.9 | 4.3 | 250 | 300 | 2.5 | 29 | 60 | 1.2 |
| 582 | 1/3.44 | 5.6 | 6.1 | 200 | 155 | 4 | 54 | 111 | 0.9 |
| 550 | 4/1 | 10 | 11.3 | 250 | 360 | 4 | 41 | 79 | 0.4 |
| 562 | 4/1 | 10 | 11.3 | 300 | 500 | 4 | 31 | 60 | 1.0 |

[1] Based on isobutylene reactant.

The data in above Table B shows the effectiveness of my method in converting isobutylene into tertiary butyl acetate while at the same time desirably producing only a minimum amount of polymerization product.

EXAMPLE II

The procedure of this example is comparable to the procedure of Example I with the exception that sulfuric acid was substituted for the sulfur dioxide catalyst. The liquid product was analyzed by mass spectrometry. The reaction data and results are reported below in Table C.

Table C

| Reactants and catalysts, mol: | Run No. 600 |
|---|---|
| Isobutylene | 1 |
| Acetic acid | 2 |
| Sulfuric acid | 0.9 |
| Mol percent of $H_2SO_4$ based on total mols of acetic acid and isobutylene | 3 |
| Wt. percent of $H_2SO_4$ based on total weight of acetic acid and isobutylene | 5 |
| Reaction conditions: | |
| Temp., °F. | 130 |
| Pressure, p.s.i.g. | 60 |
| Time, hrs. | 1 |
| Products, mol percent yields [1] | |
| t-Butyl acetate | 28 |
| Diisobutylene [2] | 13 |
| Products, wt. percent yield [1] | |
| t-Butyl acetate | 58 |
| Diisobutylene | 26 |

[1] Based on isobutylene reactant.
[2] Mols diisobutylene formed/mols isobutylene charged.

As can be seen by comparing the yields of diisobutylene of Table C with those of Tables A and B, the replacement of sulfur dioxide with a sulfuric acid catalyst results in the undesirable production of substantially larger quantities of polymerized product even at a reduced temperature.

EXAMPLE III

The procedure of this example is the same as the procedure of Example I with the exception that catalyst was not employed and the reactor was pressured with nitrogen to the indicated pressure. The liquid product was analyzed by mass spectrometry. The reaction data and results are found below in Table D.

Table D

| Reactants and catalysts, mol: | Run No. 588 |
|---|---|
| Isobutylene | 3 |
| Acetic acid | 6 |
| Reaction conditions: | |
| Temp., °F. | 200 |
| Pressure, p.s.i.g. | 600 |
| Time, hrs. | 6 |
| Products, mol percent yield [1] | |
| t-Butyl acetate | 1.5 |
| Diisobutylene | 0 |
| Products, wt. percent yield [1] | |
| t-Butyl acetate | 3.1 |
| Diisobutylene | 0 |

[1] Based on isobutylene reactant.

As can be seen by comparing the yield of the above run No. 588 with those of Tables A and B, the presence of sulfur dioxide in applicant's process is necessary to produce a tertiary ester in significant quantities.

All percentages, parts and ratios hereinbefore and hereinafter recited are based on weight unless otherwise stated.

Obviously, many modifications and variations of the invention as hereinbefore set forth may be made without departing from the spirit and scope thereof and therefore only such limitations should be imposed as are indicated in the appended claims.

I claim:

1. In a process for the condensation of an aliphatic tertiary monoolefinic hydrocarbon of 4 to 12 carbon atoms with a carboxylic acid selected from the group consisting of a monobasic fatty acid, saturated aliphatic hydrocarbon dibasic acid, aryl monocarboxylic acid and alkaryl monocarboxylic acid to form the corresponding tertiary ester in the reaction zone, the improvement which comprises: contacting said monoolefinic hydrocarbon with said acid at an elevated temperature and pressure in the presence of sulfur dioxide.

2. A method in accordance with claim 1 wherein said pressure is between about 50 and 2000 p.s.i.g., said temperature is between about 135 and 350° F., said hydrocarbon and said acid are in a mol ratio between about 1:10 and 10:1 and said sulfur dioxide is present in a mol percent between 0.5 and 20 based on the total mols of reactants.

3. A method in accordance with claim 1 wherein said pressure is between about 100 and 300 p.s.i.g., said temperature is between about 150 and 225° F., said hydrocarbon and said acid are in a mol ratio between about 1:4 and 4:1 and said sulfur dioxide is present in a mol percent between 1 and 10 based on the total mols of reactants.

4. A method in accordance with claim 1 wherein said hydrocarbon is isobutylene.

5. A method in accordance with claim 1 wherein said hydrocarbon is in admixture with at least one other hydrocarbon having 4 carbon atoms.

6. A method in accordance with claim 1 wherein said acid is a monobasic fatty acid having from 1 to 8 carbon atoms.

7. A method in accordance with claim 6 wherein said acid is acetic acid.

No references cited.